United States Patent Office 3,427,951
Patented Feb. 18, 1969

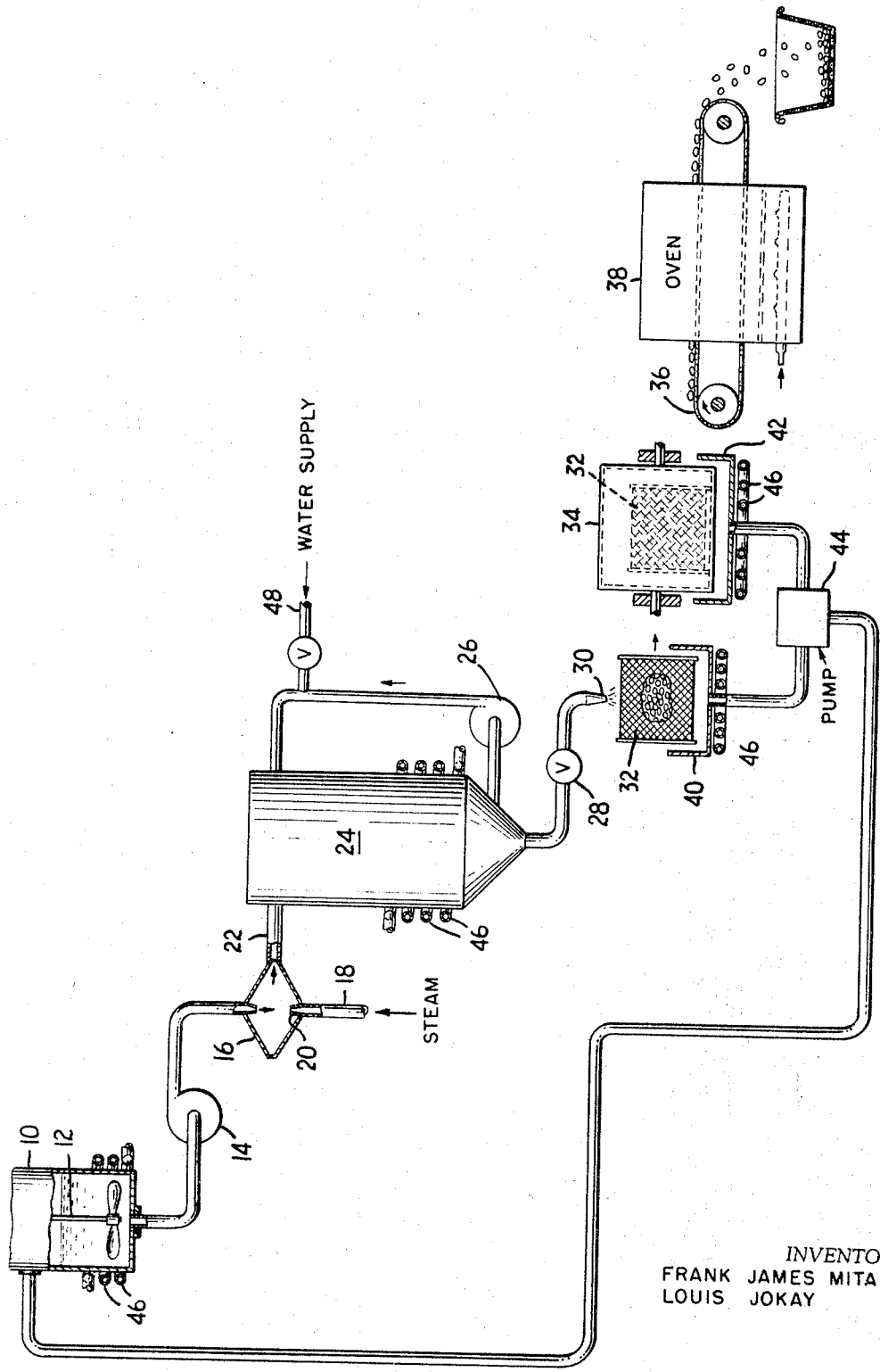

3,427,951
PROCESS OF COATING FOOD
Frank J. Mitan, Whiting, Ind., and Louis Jokay, Evanston, Ill., assignors to American Maize-Products Company, a corporation of Maine
Filed Mar. 17, 1965, Ser. No. 440,559
U.S. Cl. 99—166                6 Claims
Int. Cl. A23b 7/16, 5/06, 3/14, 1/10

ABSTRACT OF THE DISCLOSURE

Protective coatings are formed on the surface of foods and other articles by forming an aqueous slurry containing a hydroxyalkyl ether of starch having a natural amylose content of at least about 50% by weight, cooking the slurry under super-atmospheric pressure to at least partially gelatinize the starch ether granules, releasing the cooked slurry to atmospheric pressure and then applying it as a film on the surface of the food or article to be coated. A continuous process is also described for applying a coating of modified or unmodified starch, having a natural amylose content of at least about 50% by weight, to foods or other articles.

---

The present invention is based on the discovery that compositions containing hydroxy alkyl ether derivatives of high amylose starch make an excellent coating on edible foods. The subject matter of the invention also includes a process for applying starch coatings to edible foods.

Recently a great deal of research work has been done to develop an edible water soluble film coating on edible foods. The Army Quartermaster Corps is particularly interested in coating foods for use by astronauts in space flights and the food industry desires to coat foods to improve packaging techniques and preservation of packaged foods.

In order to form a satisfactory coating on edible foods, there are a number of conditions that must be met. First of all the coating must readily dissolve in the mouth and be edible without objectionable odor or taste. The coating must not be sticky and it must withstand relatively high humidity and temperatures say up to about 110° F. without melting or becoming objectionably sticky. But at the same time the coating cannot be brittle or it will chip and flake off. Finally the coating should not have an objectionable texture such as that possessed by waxy or rubbery materials.

The coating is of advantage to inhibit shattering of fragile foods in the package and the coating reduces the formation of crumbs when the food is eaten which is important to prevent the fouling of scientific instruments in the weightless environment of a space ship. In accordance with the present invention, the coating is preferably applied as a continuous envelope on the edible food and in such case it assists in preserving the original fresh characteristics of the food.

In accordance with the present invention a high amylosic starch material is reacted with ethylene or propylene oxide in conventional manner to form an amylosic starch ether which in gelantinized form is combined with an edible liquid carrier such as water to form a liquid film forming composition that contains from about 5 to 40% of amylosic starch ether solids by weight. The liquid composition is applied as a film to edible foods as by dipping the food into the mix or by spraying or otherwise applying the mix as a coating to the exposed surface of the food. The finished film is formed by evaporating the liquid carrier under atmospheric conditions or if desired drying may be accelerated with a flow of hot air.

In research work it has been found necessary to have not less than 50% of amylose in the starch solids of the film in order to form a satisfactory coating. Such high amylosic starch materails are well known and may be formed by mixing pure amylose with ordinary starch derived from common grain or roots such as corn, potatoes, wheat, rice, waxy maize, tapioca, etc. Preferably a naturally grown high amylose corn starch is used which contains over 50% amylose.

The reaction of starch with ethylene or propylene oxide to form edible water soluble hydroxy alkyl starch ethers is known and is for example described in U.S. Patent No. 2,516,634. In the usual practice the selected ethylene or propylene oxide is reacted with starch in an aqueous alkaline environment. The reaction may also be carried out dry. The starch granules may be gelatinized during reaction or the original granular structure may be preserved depending upon the condition employed during reaction. The amount of alkylene oxide that is reacted with starch will determine the ease with which the starch will dissolve in the mouth. For the purpose of the present intention, starch containing not less than 50% amylose is preferably reacted with at least 5% by weight of ethylene or propylene oxide based on the weight of starch solid. The most desirable solubility characteristics are achieved by reacting the amylosic starch with between about 10 to 30% of ethylene or propylene oxide based on the weight of starch solid. For best results we prefer to react starch containing not less than 50% amylose with propylene oxide in accordance with the method described in a copending patent application Ser. No. 436,927, filed Mar. 3, 1965, now Patent No. 3,378,546.

As used in this specification and in the claims it will be understood that the term "water soluble edible amylosic starch ether" means starch solids containing not less than 50% by weight of amylose which starch has been reacted with ethylene or propylene oxide.

In some applications it may be desirable to have flavoring, vitamins or other materials seuch as the known edible plasticizers and humectants present in the starch film coating. Plasticizers such as glycerine, corn syrup solids, edible polyhydric alcohols and humectants such as CMC (carboxy methyl cellulose), gelatine, alginates and edible gums have proved to be satisfactory. Such ingredients may be added in minor proportions to the liquid mix without interferring with the film forming characteristics of the water soluble edible amylosic starch ether.

In work carried out to date, it was necessary to cook the amylosic starch ether granules under superatmospheric pressure in order to form a liquid composition which would form a continuous film for enveloping the food as a preservative. When starch ether granules cooked at atmospheric pressure were used in the liquid composition the coating formed on the food was discontinuous and there were pin holes through which air could freely pass into the coated food. At superatmospheric pressure the starch granules may be cooked at about 180° F. or above. In some applications however starch film containing pin holes may be used to advantage depending upon the purpose to be accomplished by the film coating and in such case the coating is made and applied as set forth herein except that the step of cooking the starch granules at superatmospheric pressure is not necessary.

In work performed for the Army Quartermaster Corps the food was freeze dehydrated to a very low moisture content of about 2% by weight before the starch film coating of the present invention was applied. However the foods to be coated need not be freeze dehydrated or alternatively the food may be freeze dehydrated after the coating is applied if that should be desirable.

Further details of the present invention may be readily understood in connection with the description given in the examples which have been selected for the purpose of illustration.

In the following examples starch granules which contained 70% amylose were reacted with about 10% propylene oxide by weight and then compositions were formed with the stated parts by weight of water, plasticizer and humectant.

|  | 1 | 2 | 3 | 4 | 5 | 6 |
|---|---|---|---|---|---|---|
| Starch Granules |  |  |  |  |  |  |
| Parts by Weight | 30.0 | 28.5 | 19.0 | 14.25 | 28.5 | 30.0 |
| Plasticizer | (1) | (1) | (1) | (1) | (1) | ------ |
| Parts by Weight | 6.0 | 6.0 | 5.0 | 3.0 | 6.0 | ------ |
| Humectant | (2) | (2) | (2) | (3) | ------ | ------ |
| Parts by Weight | 1.5 | 1.0 | 0.75 | 1.5 |  |  |
| Water Parts by Weight | 64.0 | 164.0 | 175.0 | 182.0 | 164.0 | 70.0 |

[1] Glycerine.
[2] Gelatine.
[3] CMC.

The above compositions were heated to a temperature at which the granules gelatinize which in the examples was 190° F. and cooked preferably with stirring under 15 p.s.i. gauge pressure for about thirty minutes to complete the cooking.

The water content of the composition of Example 1 was adjusted to the solid content set forth below to form liquids which were held at the indicated temperature while caramel candy cubes, fruit cake and Graham crackers were submerged in the liquid by dipping to form a water soluble edible amylosic starch ether film on the food. The viscosity of the dip liquids was between about 30 cps. to 3,000 cps.

Percent solids by weight:

A _____ 8–10
    B _____ 10–20
    C _____ 20–36

Temperature, ° F.:

A _____ 60–100
    B _____ 100–160
    C _____ 160–190

The starch film coated foods were placed in an oven where hot air at a temperature of about 100 to 150° F. was circulated to dry the film. Compositions B and C were also applied with a doctor blade and in other cases with a brush to form starch films on the foods specified in the examples.

Films formed with composition A were effective to resist shattering of the Graham crackers. Films made with compositions B and C were continuous solid films without pin holes or other discontinuities and these films enveloped the food as a protective shield against atmospheric air. The films were not tacky or sticky and there was no tendency to chip or flake off. When eaten the films readily dissolved in the mouth without objectionable odor, taste or texture. Samples submitted to the Quartermaster Corps were deemed satisfactory for the space flight program.

The compositions of Examples 2–5 were used as a liquid dip to form a water soluble edible amylosic starch ether film on cereal fruit cubes, cheese sandwiches and peanut butter sandwiches. In all cases the films formed a satisfactory protective envelope on the food. The composition of Example 6 containing 20% solids by weight was heated to 190° F. and poured over fresh eggs to form a protective coating. Coated and uncoated eggs taken from the same batch were stored at room temperature for 34 days. When placed in water the coated eggs sank while the uncoated control eggs floated showing that the uncoated eggs were no longer edible.

A preferred process for applying starch film to foods and other materials has also been developed. In this process starch granules are employed in aqueous slurry containing from about 5 to 40% of starch granules by weight and no less than 50% by weight of the solid starch is amylose. If a water soluble coating is desired on edible foods the hydroxy alkyl ether derivatives of amylose are preferably employed in the slurry.

The process is best understood by description in connection with the drawings in which:

The figure is a diagram which illustrates a preferred form of apparatus employed in carrying out the process of the present invention.

As shown in the figure an aqueous slurry of starch granules is made up in tank 10 with suitable agitation as indicated at 12. Pump 14 feeds the starch slurry into a conventional jet heater such as the Schutte and Koerting continuous jet heater 16, into which steam under superatmospheric pressure is fed into the starch slurry by pipe 18 and jet 20. The starch and steam violently commingle in the jet heater and there is a partial instantaneous cooking and gelatinization of the starch granules.

The partially cooked starch in aqueous slurry passes through pipe 22 into tank 24 which maintains the starch under superatmospheric pressure. Pump 26 recycles the starch slurry in tank 24 to agitate the slurry and maintain a uniform composition. The cooked starch from tank 24 may be released to atmospheric pressure and collected in a suitable vessel for use in coating edible foods and other items as by dipping or spraying the coating as a film on the food. One convenient way in which this can be done is illustrated in the figure. As there shown, valve 28 is opened to feed the starch slurry under superatmospheric pressure to nozzle 30 which flashes the starch liquid to atmospheric pressure and sprays the starch liquid on the item to be coated such as edible foods which are in an open wire mesh basket 32. Nozzle 30 is a conventional nozzle with an adjustable spray head which may be adjusted to deliver a fine spray mist or a coarse spray of rain drops. After the starch coating has been applied, the wire basket is placed in a conventional centrifuge 34 where light centrifuging takes place to remove excess starch liquid. The amount of centrifuging is determined by the thickness of the coating desired on the final product. After centrifuging the coated item is removed from the wire basket and placed on the continuous belt 36. Belt 36 conveys the coated item through oven 38 where hot air at a temperature between about 100 to 150° F. is circulated to dry the starch film.

The excess starch liquid from nozzle 30 and centrifuge 34 is collected in pans 40 and 42 and returned to the starch slurry tank 10 by pump 44. If desired tanks 10 and 24 and pans 40 and 42 may be provided with suitable heating and cooling coils of pipe 46 in order to maintain the desired temperature for operation with the selected starch slurry. Water may be added to the starch slurry in tank 24 by means of pipe 48 to adjust the solid starch content in the liquid before it is applied as a film to the item to be coated.

The operating conditions are as follows:

(1) An aqueous slurry is employed in tank 10 which contains between about 5 to about 40% by weight of starch granules in which not less than 50% of the solid starch is amylose and in the case of edible water soluble films the hydroxy alkyl ether derivatives of the high amylose starch is employed as described hereinabove. The starch slurry is not cooked in tank 10 but heat may be applied to facilitate pumping of the slurry.

(2) Rate of flow of slurry to jet heater 16 is from about 1/10 gal./min. to about 8 gal./min.

(3) Steam pressure to jet heater 16 is from about 30 p.s.i. to about 110 p.s.i.

(4) The temperature of the slurry leaving the jet heater is from about 225° F. to about 300° F.

(5) Gauge pressure in tank 24 is from about 10 p.s.i. to about 60 p.s.i.

(6) Temperature in tank 24 is from about 60° F. to about 200° F.

(7) Pressure and temperature of the liquid fed to the spray nozzle is the same as that in tank 24. The nozzle may be set to deliver a fine mist or spray using a total of about 1/10 gal./min. to about 8 gal./min.

(8) The viscosity of the starch liquid applied to the item to be coated is between about 30 cps. and 3,000 cps.

(9) The speed of centrifuging will determine the thickness of the film for a given viscosity. In general the r.p.m. of the centrifuge is between about 500 to 2,000 r.p.m. for from about 15 to 90 seconds.

(10) The speed of the conveyor belt in oven 38 is preferably 200–500 feet per minute. The temperature of circulating hot air is from about 100° F. to about 150° F.

Example 7

Starch granules containing 75% amylose reacted with 15% by weight of propylene oxide are admixed with glycerol and water in tank 10 to form an aqueous slurry containing 15% by weight of starch solids and 20% of glycerol based on the weight of starch. The temperature of the slurry is 100° F. The slurry is cooked and applied as a film to cut almonds with the apparatus of the figure to be operated as follows:

(1) Rate of flow of slurry to jet heater 16—5 gals./min.

(2) Steam pressure in jet heater 16—77 p.s.i.

(3) Temperature of partially cooked slurry leaving jet heater 16—270° F.

(4) Gauge pressure in tank 24—15 p.s.i.

(5) Temperature of starch liquid applied to almonds 24—155° F.

(6) Viscosity of starch liquid applied to almonds—100 cps.

(7) The nozzle delivers a fine spray mist drawing 5 gals./min. from tank 24.

(8) The centrifuging is carried out by accelerating to 2,000 r.p.m. and suddenly decelerating. Total time 30 seconds.

(9) Speed of conveyor belt—300 ft./min.

(10) Temperature of air in oven 38—125° F.

Examination will show that the films formed on the almonds are continuous solid films which completely envelope the almonds with a protective shield. The thickness of the film is about 3 to 5 mils.

The following compositions which include unmodified high amylosic starch granules as well as modified high amylosic starch derivatives may be employed in the above described continuous process or in the batch dip process for coating selected items. In the examples the following abbreviations are employed. In all cases the solid starch granules contain not less than 50% amylose and the amount of reagent employed in the modification reaction is between about 5 to 30% by weight of starch solids. The modified derivatives of starch granules selected for the purpose of illustration are known derivatives of starch and preparation of such derivatives are well known in the art.

HES—Starch granules reacted with 10% by weight of ethylene oxide.
CMS—Carboxy methyl starch granules.
AA—Starch granules reacted with acidic anhydride or other known anhydride.
MS—Hydroxypropyl starch granules.
S—Unmodified starch granules.
OS—Starch granules reacted with calcium hypochlorite.

|  | 8 | 9 | 10 | 11 | 12 | 13 |
|---|---|---|---|---|---|---|
| Starch Granules | S | HES | CMS | AA | MS | OS |
| Parts by Weight | 30 | 30 | 25 | 18 | 20 | 14 |
| Plasticizer | (1) | (2) | (3) |  | (4) |  |
| Parts by Weight |  | 3 | 5 | 4 |  | 6 |
| Humectant |  |  |  |  | (5) |  |
| Parts by Weight |  |  |  |  | 5 |  |
| Water Parts by Weight | 70 | 67 | 70 | 82 | 75 | 80 |

1 Glycerine.
2 D-Sorbitol.
3 Ethylene Glycol.
4 Glycerine.
5 Guar Gum.

It will be understood that it is intended to cover all changes and modifications of the preferred embodiments of the invention herein chosen for the purpose of illustration which do not constitute departures from the spirit and scope of the invention.

We claim:

1. The method of forming an edible film as a protective coating on food consisting of the steps of forming an aqueous slurry of water soluble edible amylosic starch ether granules, said starch ether slurry containing between about 5 to 40% by weight of said solid amylosic starch ether derived from a parent starch material which contains not less than 50% by weight of amylose, heating the starch ether slurry to a temperature of at least 180° F. under super-atmospheric pressure to cook the granules, releasing the cooked starch ether liquid to atmospheric pressure and then applying the liquid to a food to form a film thereon.

2. The method specified in claim 1 which includes the step of heating the slurry by injecting steam at superatmospheric pressure into the liquid slurry.

3. The method specified in claim 1 which includes the step of cooking the starch granules at a pressure of at least 15 p.s.i. and at a temperature of at least 180° F.

4. The method specified in claim 1 which includes the step of adding a humectant flavoring and/or vitamin to the starch slurry.

5. The method specified in claim 1 which includes the step of spraying the starch liquid under pressure onto the food to be coated.

6. The method of forming an edible film on food consisting of the steps of forming an aqueous slurry of water soluble edible amylosic starch ether granules, said starch ether being derived from a parent starch material which contains not less than 50% by weight of amylose, heating the amylosic starch ether slurry under superatmospheric pressure to cook the granules, releasing the cooked starch ether liquid to atmospheric pressure and if necessary adjusting the water content in the liquid to form a liquid containing between about 5 to 40% by weight of solids and then applying the cooked starch ether liquid to a food while holding the liquid at a temperature between about 60° F. to about 190° F. to form a film on such food.

References Cited

UNITED STATES PATENTS

| 2,516,634 | 7/1950 | Kesler et al. | 260—209 |
| 2,622,033 | 12/1952 | Fusco | 99—168 |
| 3,122,534 | 2/1964 | Muetgeert et al. | 99—168 X |
| 3,368,909 | 2/1968 | Moore et al. | 99—168 |

HYMAN LORD, *Primary Examiner.*

U.S. Cl. X.R.

99—168, 170